US012180749B2

(12) United States Patent
Steinman et al.

(10) Patent No.: US 12,180,749 B2
(45) Date of Patent: Dec. 31, 2024

(54) LOCKING SYSTEM WITH MULTIPLE LATCHES

(71) Applicant: CAPITOL DEVELOPMENT, LLC, Boca Raton, FL (US)

(72) Inventors: Robert J. Steinman, Boca Raton, FL (US); Phan Quang Tuyen, Ho Chi Minh (VN)

( * ) Notice: Subject to any disclaimer, the term of this patent is extended or adjusted under 35 U.S.C. 154(b) by 118 days.

(21) Appl. No.: 18/126,425

(22) Filed: Mar. 25, 2023

(65) Prior Publication Data

US 2023/0243187 A1 Aug. 3, 2023

Related U.S. Application Data

(63) Continuation of application No. 17/063,624, filed on Oct. 5, 2020, now Pat. No. 11,643,846, which is a (Continued)

(51) Int. Cl.

*E05C 9/00* (2006.01)
*B65D 25/28* (2006.01)

(Continued)

(52) U.S. Cl.

CPC ............ *E05B 53/005* (2013.01); *B65D 25/28* (2013.01); *B65D 55/14* (2013.01); *E05B 65/0003* (2013.01); *E05B 65/462* (2013.01); *E05B 65/5215* (2013.01); *E05C 9/00* (2013.01); *E05C 9/1833* (2013.01); *B65D 2525/283* (2013.01); *E05B 65/0007* (2013.01); *E05C 9/06* (2013.01);

(Continued)

(58) Field of Classification Search

CPC ............. Y10T 292/03; Y10T 292/0834; Y10T 292/0841; E05B 65/215; E05B 65/462; E05B 65/0003; E05B 65/006; E05B 65/0075; E05B 65/44; E05B 65/466; E05B 65/52; E05B 65/5215; E05B 63/12; E05B 63/14; E05B 63/18; E05B 63/22; E05B 17/20; E05B 9/00; E05B 9/1833

USPC ....................... 296/37.15; 220/625, 628, 630

See application file for complete search history.

(56) References Cited

U.S. PATENT DOCUMENTS

| | | | | |
|---|---|---|---|---|
| 140,307 A | | 6/1873 | Rand | |
| 335,456 A | * | 2/1886 | Hopkins | E05B 65/462 70/87 |

(Continued)

FOREIGN PATENT DOCUMENTS

| | | | |
|---|---|---|---|
| CN | 1740496 A | * | 3/2006 |
| DE | 9300171 U1 | * | 4/1993 |

(Continued)

OTHER PUBLICATIONS

International Search Report for PCT/US2013/039935.

*Primary Examiner* — Carlos Lugo

(57) ABSTRACT

A locking system provides multiple lockable latching mechanisms that are collectively operable and lockable from a central actuation mechanism. Each latching mechanism can be positioned and actuated independent of the positioning of others of the latching mechanisms. In particular, the latching mechanisms need not be aligned with one another. The system uses flexible connectors between the central actuation mechanism and the respective latching mechanisms. The flexible connectors can have different respective lengths.

11 Claims, 14 Drawing Sheets

Related U.S. Application Data continuation of application No. 16/827,911, filed on Mar. 24, 2020, now abandoned, which is a continuation of application No. 15/000,029, filed on Jan. 18, 2016, now Pat. No. 10,655,364, which is a continuation-in-part of application No. 13/708,394, filed on Dec. 7, 2012, now Pat. No. 9,238,930.

(51) Int. Cl.

| | |
|---|---|
| ***B65D 55/14*** | (2006.01) |
| ***E05B 53/00*** | (2006.01) |
| ***E05B 65/00*** | (2006.01) |
| ***E05B 65/462*** | (2017.01) |
| ***E05B 65/52*** | (2006.01) |
| ***E05C 9/18*** | (2006.01) |
| *E05C 9/06* | (2006.01) |

(52) U.S. Cl.
CPC .... *Y10T 292/0841* (2015.04); *Y10T 292/0962* (2015.04)

(56) References Cited

U.S. PATENT DOCUMENTS

| | | | | | |
|---|---|---|---|---|---|
| 1,152,776 | A | | 9/1915 | Wolfe et al. | |
| 1,360,040 | A | | 11/1920 | Slauson | |
| 1,560,489 | A | * | 11/1925 | Yager | E05C 9/046 292/37 |
| 2,022,718 | A | | 12/1935 | Heins | |
| 2,347,705 | A | | 5/1944 | Mosler et al. | |
| 2,415,612 | A | | 2/1947 | Straessli | |
| 2,486,460 | A | | 11/1949 | Bonenberger | |
| 2,649,322 | A | | 8/1953 | Mack | |
| 2,717,169 | A | | 9/1955 | Lindbloom | |
| 2,843,409 | A | | 7/1958 | Johannesen | |
| 2,879,725 | A | * | 3/1959 | Zuver | E05B 65/0075 109/42 |
| 3,072,286 | A | * | 1/1963 | Cusumano | F16J 13/02 292/38 |
| 3,270,151 | A | | 8/1966 | Godette | |
| 3,520,567 | A | | 7/1970 | Van Gilst | |
| 3,965,564 | A | | 6/1976 | Slovensky | |
| 4,066,307 | A | * | 1/1978 | Barding | B60R 11/02 70/423 |
| 4,114,933 | A | | 9/1978 | Jankelewitz et al. | |
| 4,288,944 | A | | 9/1981 | Donovan | |
| 4,387,917 | A | | 6/1983 | Cocker | |
| 4,469,382 | A | * | 9/1984 | Slaats | E05B 65/46 312/194 |
| 4,534,192 | A | | 8/1985 | Harshbarger et al. | |
| 4,559,880 | A | * | 12/1985 | Lacka | E05G 1/00 109/51 |
| 4,892,338 | A | | 1/1990 | Weinerman et al. | |
| 4,967,987 | A | | 11/1990 | Swank | |
| 5,015,019 | A | | 5/1991 | Razdolsky | |
| 5,022,242 | A | * | 6/1991 | Povilaitis | G11B 33/005 70/168 |
| 5,184,853 | A | | 2/1993 | Whatley | |
| 5,278,538 | A | | 1/1994 | Ainsworth et al. | |
| 5,595,076 | A | | 1/1997 | Weinerman et al. | |
| 5,660,081 | A | | 8/1997 | Sato | |
| 5,686,810 | A | * | 11/1997 | Yasui | H01M 10/46 429/97 |
| 5,862,692 | A | | 1/1999 | Legault et al. | |
| 5,941,104 | A | | 8/1999 | Sadler | |
| 5,957,292 | A | * | 9/1999 | Mikkelsen | H01L 21/67373 414/217 |
| 6,216,391 | B1 | | 4/2001 | Garrett, Jr. | |
| 6,301,991 | B2 | | 10/2001 | Ficyk et al. | |
| 6,454,210 | B1 | | 9/2002 | Plattner | |
| 6,490,895 | B1 | | 12/2002 | Weinerman et al. | |
| 6,546,765 | B1 | | 4/2003 | Linares | |
| 6,748,776 | B2 | | 6/2004 | Bullock et al. | |
| 6,986,493 | B2 | | 1/2006 | Yokota | |
| 7,104,619 | B2 | | 9/2006 | Ludwig et al. | |
| 7,237,812 | B2 | | 7/2007 | Tweedy | |
| 7,434,854 | B2 | | 10/2008 | Fujimatsu et al. | |
| 7,552,954 | B2 | | 6/2009 | Rozo et al. | |
| 7,553,237 | B2 | * | 6/2009 | Rodriguez | G07F 17/3216 70/264 |
| 7,665,245 | B2 | | 2/2010 | Speyer et al. | |
| 7,788,954 | B2 | | 9/2010 | Schumm | |
| 7,817,414 | B2 | * | 10/2010 | Chou | H01R 13/633 361/679.56 |
| 7,823,934 | B2 | * | 11/2010 | Huang | G11B 33/12 292/161 |
| 8,136,897 | B2 | * | 3/2012 | Mascari | E05B 65/52 16/342 |
| 8,328,299 | B2 | | 12/2012 | Hashemi et al. | |
| 8,457,784 | B2 | * | 6/2013 | Rahilly | G07F 11/62 700/242 |
| 8,628,125 | B2 | | 1/2014 | Huang et al. | |
| 9,062,476 | B2 | | 6/2015 | Kao et al. | |
| 9,074,392 | B2 | | 7/2015 | Berger | |
| 9,238,930 | B2 | | 1/2016 | Tuyen | |
| 9,429,389 | B1 | * | 8/2016 | Brewer | E05B 65/52 |
| 9,862,440 | B2 | | 1/2018 | Steinman et al. | |
| 10,045,900 | B2 | * | 8/2018 | Sciacchitano | E05B 47/0001 |
| 10,655,364 | B2 | | 5/2020 | Steinman et al. | |
| 2002/0162369 | A1 | | 11/2002 | Lurie et al. | |
| 2003/0038504 | A1 | | 2/2003 | Crean | |
| 2004/0036387 | A1 | | 2/2004 | Ludwig et al. | |
| 2007/0159038 | A1 | | 7/2007 | Huang | |
| 2011/0298224 | A1 | | 12/2011 | Raatikainen | |
| 2013/0154283 | A1 | | 6/2013 | Arlinghaus et al. | |
| 2013/0256102 | A1 | | 10/2013 | Hager et al. | |
| 2014/0030079 | A1 | | 1/2014 | Provost et al. | |
| 2014/0132009 | A1 | | 5/2014 | Chiang et al. | |
| 2015/0084492 | A1 | | 3/2015 | Braungart | |

FOREIGN PATENT DOCUMENTS

| | | | | | |
|---|---|---|---|---|---|
| DE | 4323257 | A1 | | 1/1995 | |
| DE | 4323259 | A1 | * | 1/1995 | E05B 53/003 |
| DE | 20120473 | U1 | | 3/2003 | |
| FR | 1128390 | A | | 1/1957 | |
| FR | 2763554 | A1 | | 11/1998 | |
| FR | 2931186 | A | | 11/2009 | |
| JP | 200417781 | A | | 1/2004 | |
| JP | 2007269152 | A | | 10/2007 | |
| JP | 3185283 | U | | 8/2013 | |
| KR | 100823574 | B1 | | 4/2008 | |
| KR | 101870424 | B1 | * | 7/2018 | |
| TW | I405686 | | | 8/2013 | |
| WO | 2014088633 | | | 6/2014 | |
| WO | 2015112917 | | | 7/2015 | |
| WO | WO-2018025177 | A1 | * | 2/2018 | |

* cited by examiner

LOCKING SYSTEM WITH MULTIPLE LATCHES

RELATED APPLICATIONS

This application is related to U.S. application Ser. No. 13/708,394 (filed on Dec. 7, 2012), U.S. application Ser. No. 15/000,029 (filed on Jan. 18, 2016), U.S. application Ser. No. 16/827,911 (filed on Mar. 24, 2020), and U.S. application Ser. No. 17/063,624 (filed Oct. 5, 2020), wherein the contents of each of these applications is incorporated herein by reference in totality.

FIELD OF THE INVENTION

The present invention generally relates to a unique locking system with multiple lockable latch mechanisms, the latch mechanisms each being actuable from a common central actuation mechanism. The invention more particularly relates to several applications of such a locking system in which the each of the lockable latch mechanisms can be positioned for operation independently of the position of others of the lockable latch mechanisms.

BACKGROUND OF THE INVENTION

A conventional locking system most generally provides a single locking point between two structures, such as a file drawer relative to the cabinet in which the file drawer is disposed, a door relative to its door frame, and so on. Examples of such locking systems include a deadbolt lock or a lockable doorknob for doors, or a locking cylinder (for example, key-actuated) that drives a bar or pin into a locking position for obstructing, for example, a drawer from being opened.

It is also conventionally known to operate several locking points in unison from a central location, such as using a single key to lock multiple file drawers in a vertical filing cabinet at the same time. However, such locking systems usually require a restrictive degree of proximity or alignment or both between the locking points (and, thus, between the elements being locked such as the drawers in this example). For example, a conventional single key lock for multiple drawers in a filing cabinet uses a linearly elongate bar or other rigid member that generally extends or spans across all of the drawers and is selectively moved between locked and unlocked positions by actuation of the key. Such restrictions as to proximity and/or alignment in conventional lock systems limit their usefulness if the required locking positions are distant from one another and/or are spaced apart in several dimensions.

SUMMARY OF THE INVENTION

The present invention generally relates to a locking system with multiple lockable latch mechanisms and a central actuation mechanism operably connected to each of the latch mechanisms. The latch mechanisms characteristically can be positioned where needed with more flexibility than in conventional locking systems. In particular, the present invention uses flexible connectors between the central actuation mechanism and the respective latch mechanisms. These flexible connectors can each have different lengths and permit each latching mechanism to be placed in a variety of positions relative to the central actuation mechanism, independent of the positioning of the other latching mechanisms. At least some of the positions are displaced from one another along two orthogonal directions, and in a particular example, at least some of the positions are displaced from one another along three mutually orthogonal directions. The flexible connectors usefully permit a compact installation, such as threaded through the framework of windows or through the bars of fencing. The flexible connectors further allow flexible installation options not available with conventional rigid locking bars, and the connectors can in particular be threaded through existing structures in a manner similar to electrical wiring.

BRIEF DESCRIPTION OF THE DRAWINGS

The present invention will be even more clearly understandable in view of the written description herein and the figures appended hereto, in which.

Figure 3B:
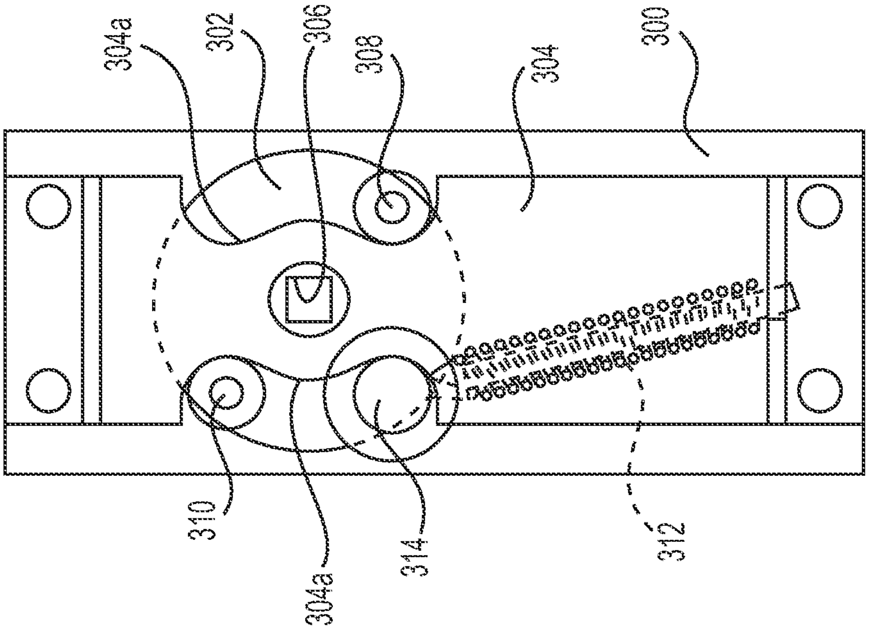
FIGS. 3A, 3B, and 3C are side, partial plan, and partial perspective views of an interior portion of an example of a central actuation mechanism of the locking system provided in the storage cabinet illustrated in FIGS. 1 and 2.
Figure 3A:
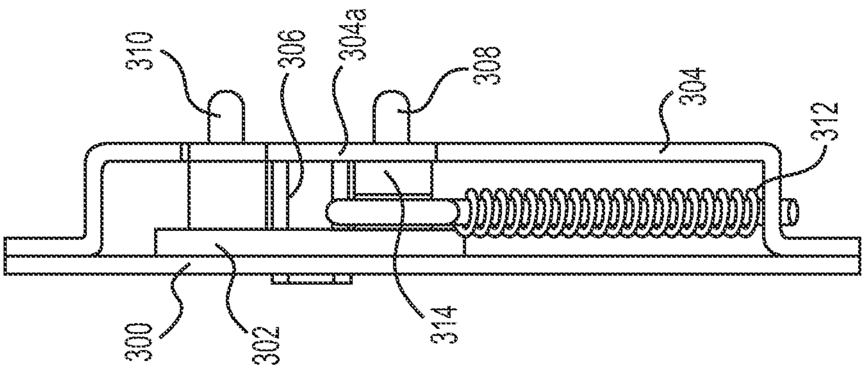
Figure 3C:
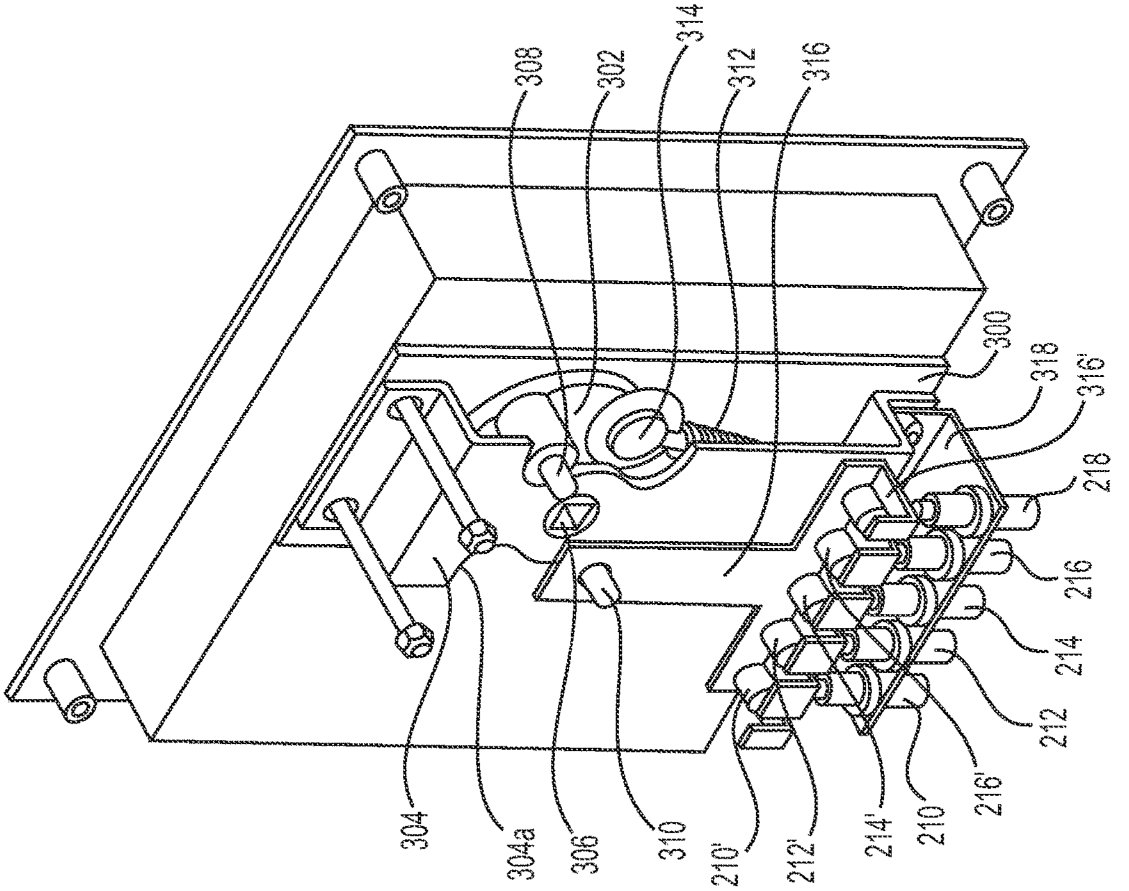

It is noted that not all of the Figures are drawn to the same scale, including elements shown in multiple-part figures (for example, in FIGS. 3A-3C).

DETAILED DESCRIPTION OF THE INVENTION

Figure 1:
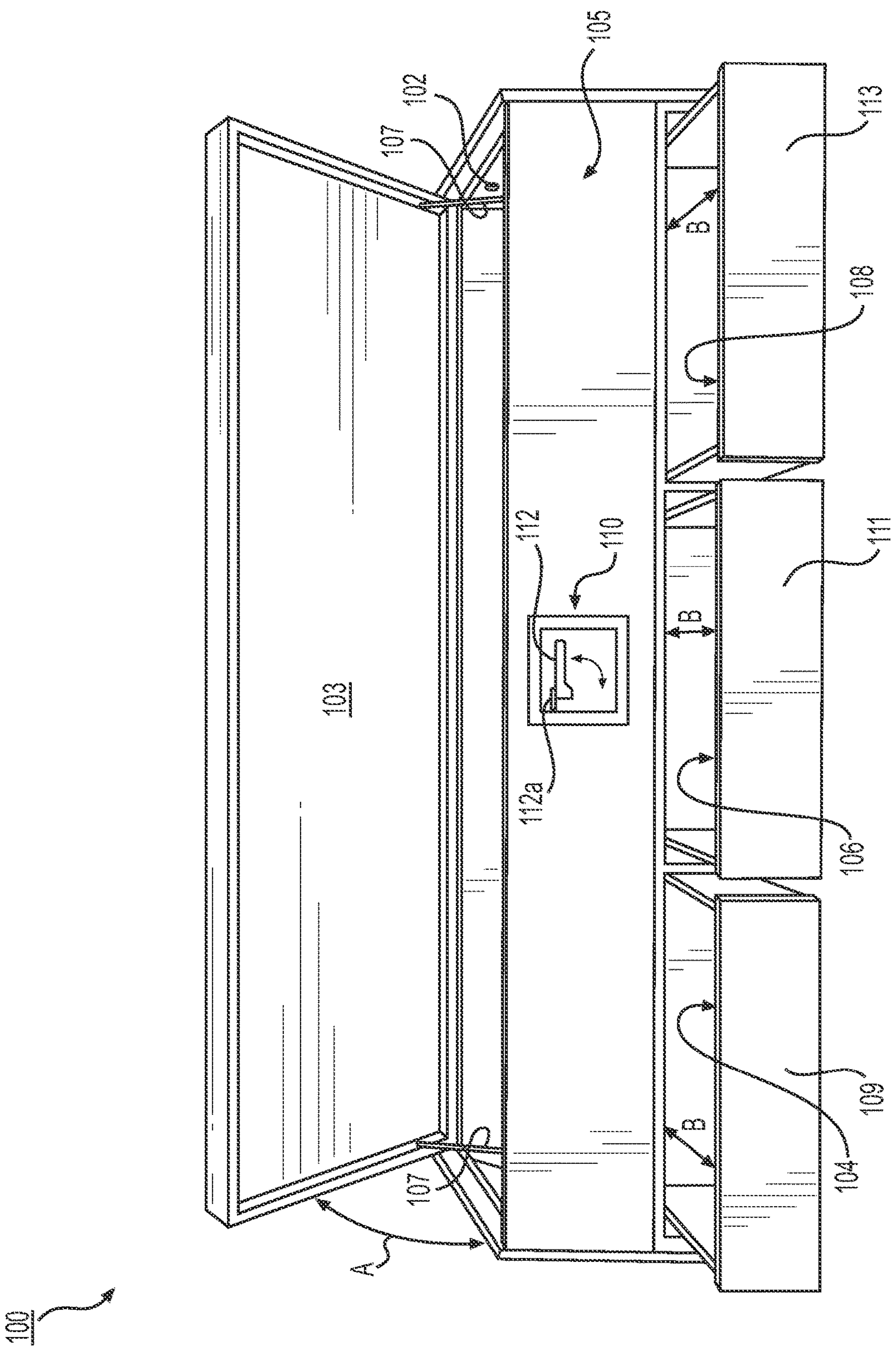
FIG. 1 is a perspective view of a storage cabinet, used here as an example implementation of the present invention.

Strictly by way of example for illustrating the concept of the present invention, FIG. 1 illustrates a storage cabinet 100 having a plurality of independently accessible storage spaces. It is emphasized that the mention of a storage cabinet here is merely an example of how the locking system of the present invention can be used, and the present invention will be easily understood to be applicable to other structural arrangements in which a plurality of locking points must be provided. As used herein, the term "locking point" is a most general reference to a physical location where some type of lock or lockable latch mechanism is provided between two physical elements.

Storage cabinet 100 may include an upper first storage space 102 that can be selectively closed by way of an upwardly swinging (see arrow A) door or lid 103 that is hinged or otherwise pivotably mounted in a conventional manner (not illustrated) to cabinet body 105. If desired or useful (for example, if lid 103 is relatively heavy or must be held open without manual support), one or more support members (such as conventional gas pistons) 107 can be provided in a known manner to at least partly support the weight of lid 103 and/or keep lid 103 in an open position.

Storage cabinet 100 may further include one or more additional lower storage spaces. In FIG. 1, for example, storage cabinet 100 further includes three selectively extensible (see arrows B) drawers 109, 111, 113 defining therein lower storage spaces 104, 106, 108, respectively. The number of lower storage spaces provided is strictly by way of example, and the provision of drawers, as such, is also by way of example. For example, the lower storage space or spaces could be accessible by way of a corresponding number of hinged or otherwise pivotably mounted doors. The relative arrangement of the plurality of storage spaces can also vary in accordance with the present invention.

As explained in further detail below, the lid 103 and drawers 109, 111, 113 can be latched (i.e., not necessarily locked) and, if desired, locked closed by way of a single central actuation mechanism 110. In an example, a pivoting handle 112 can be operated to latch (although not necessarily lock) the lid and drawers closed. Thereafter, the handle 112 itself can be locked in the latched position if desired. For example, a padlock or the like (not shown) can be passed through aligned openings 117 in handle 112 and 117*a* in an eye member 112*a* (see FIGS. 4A and 4B). In another illustrative example (not illustrated here), a key-operated lock cylinder can be provided in the handle 112 itself to selectively prevent rotation of the handle 112 (in a manner similar to conventional doorknobs and door handles provided with locks).

Figure 2:
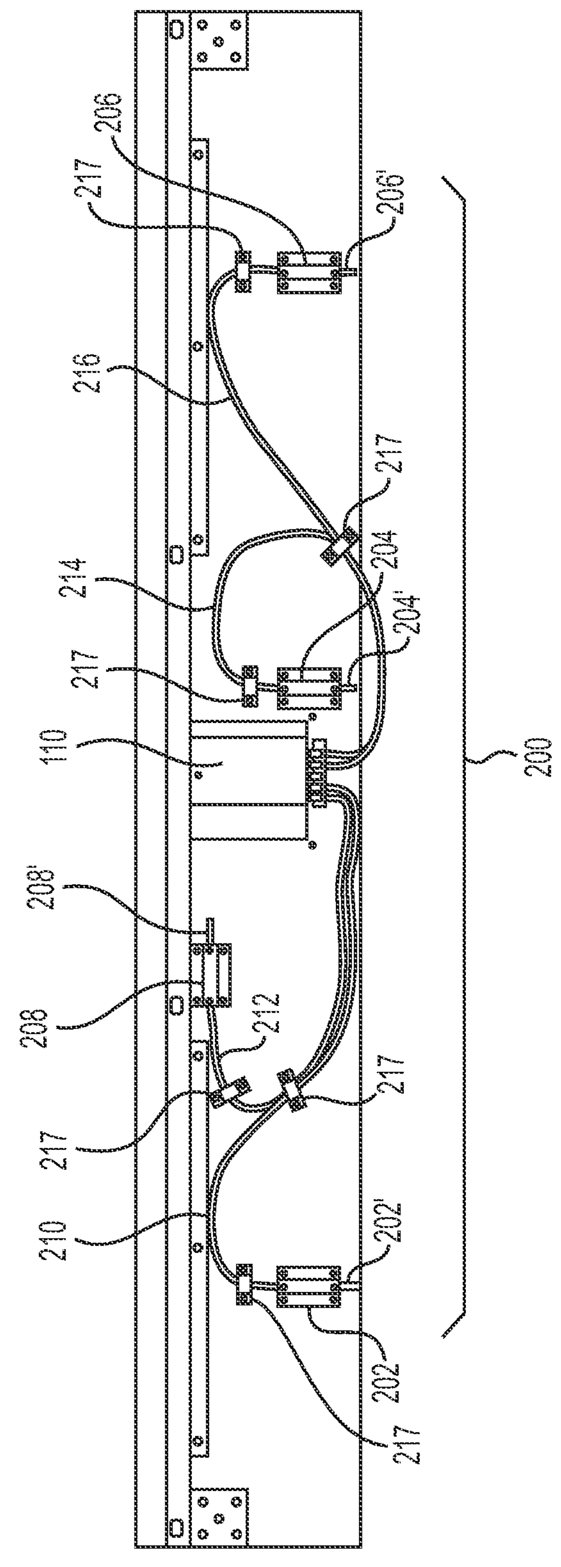
FIG. 2 is an interior portion of the storage cabinet illustrated in FIG. 1, in which an example of a locking system according to the present invention is illustrated.

FIG. 2 illustrates a part of an interior of storage cabinet 100. In particular, FIG. 2 illustrates an example of the locking system 200 of the present invention including a plurality of latch mechanisms 202, 204, 206, 208, and the central actuation mechanism (as was seen in FIG. 1) generally indicated at 110. In general, central actuation mechanism 110 is connected to the respective latch mechanisms 202, 204, 206, 208 by way of respective flexible connectors 210, 212, 214, 216. An example of a flexible connector in accordance with the present invention will be described later. A plurality of conventional cable mounts 217 may be optionally provided as needed to organize the flexible connectors and keep them lying generally against the interior surface of the storage cabinet.

In an example of the present invention, the latch mechanisms 202, 204, 206, 208 each include a protruding pin or other generally elongate latching member 202', 204', 206', 208', respectively, that is driven to selectively extend and retract in correspondence with operation of the central actuation mechanism 110. The respective latching members in turn selectively engage or latch with a cooperating part of drawers 109, 111, 113 and lid 103, respectively, when extended so as to prevent, in unison, the drawers and lid from being opened. The cooperating part may be, for example, a bore hole of appropriate diameter and depth suitably located opposite the latching member so as to receive the extended latching member therein so as to generally fix the drawer or lid fixed relative to the storage cabinet in a closed position. In another example, the cooperating part may be an eye ring suitably positioned in order to receive the extended latching member, or a metal bracket shaped to at least partly define an opening therethrough to receive the extended latching member.

Figure 4A:
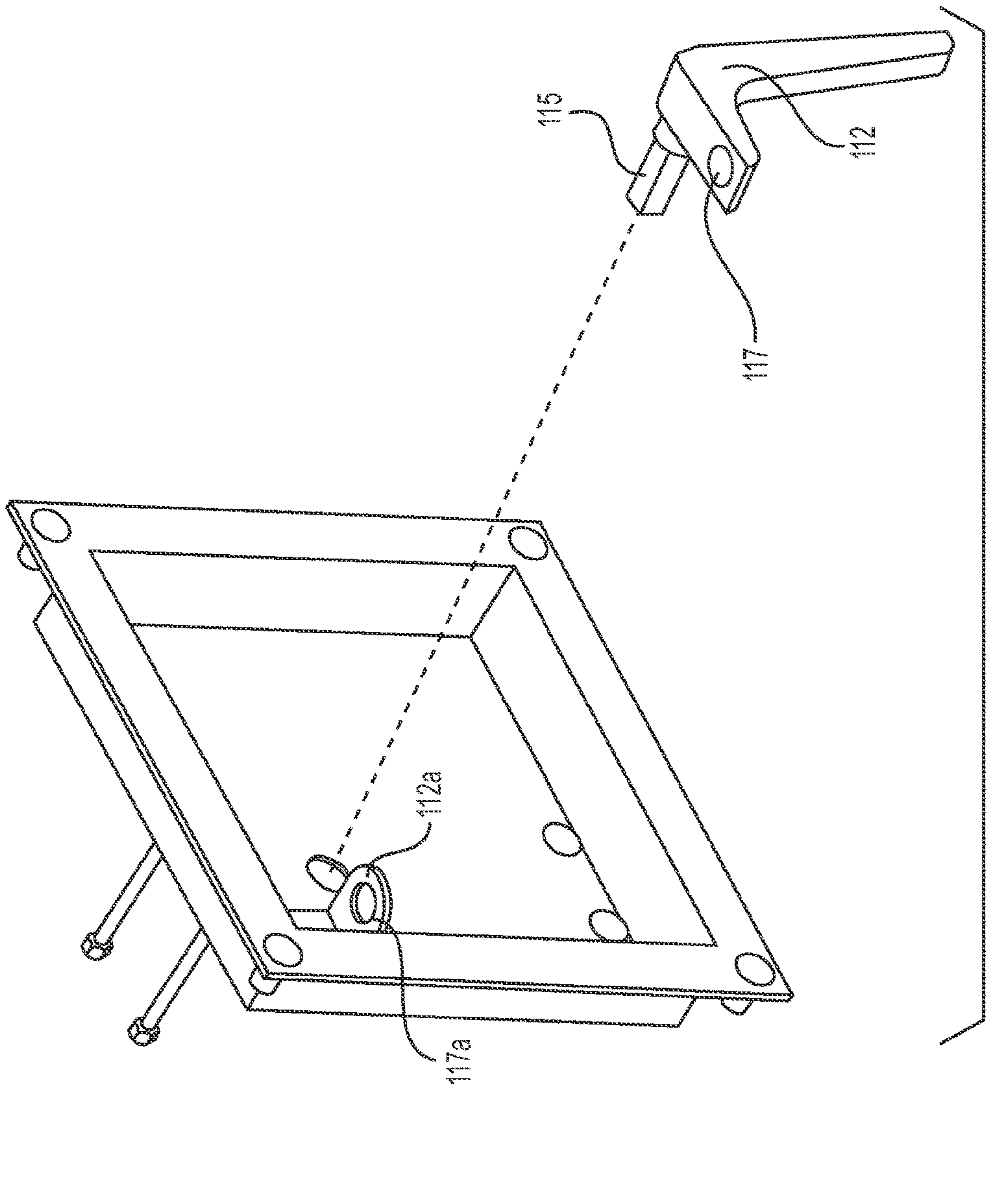
FIGS. 4A and 4B are an exploded perspective view and a perspective view of an exterior side of the central actuation mechanism of the present invention, opposite the structure(s) shown in FIGS. 3A-3C.
Figure 4B:
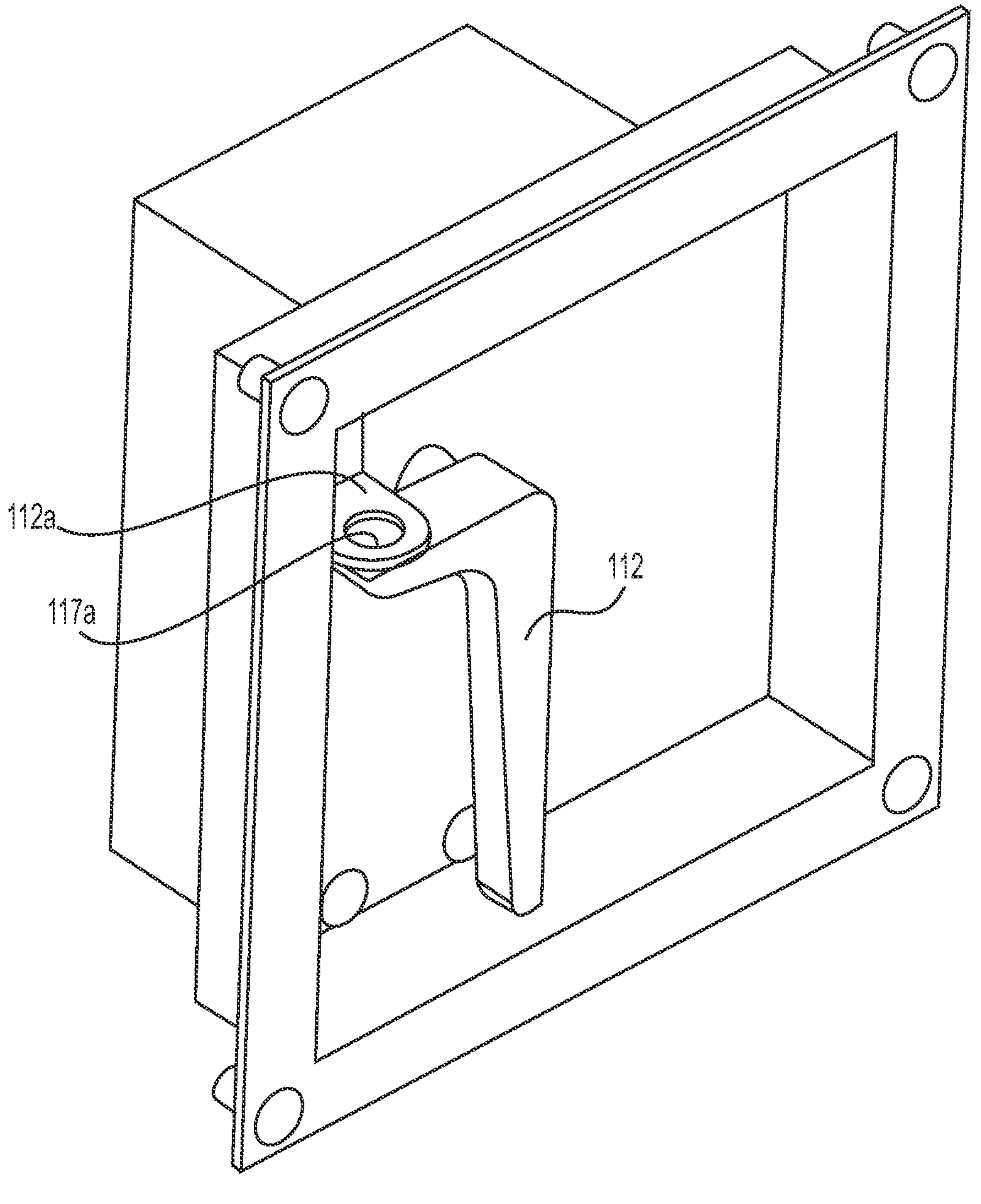

In FIG. 2, the interior side of central actuation mechanism 110 is schematically shown with a cover or protective casing (also in FIG. 4B). FIGS. 3A-3C illustrate certain structure details of the interior side of the central actuation mechanism 110 when uncovered.

In one example of the present invention as illustrated in FIGS. 3A-3C, the central actuation mechanism 110 includes a base plate 300 on which a drive member 302 is rotatably mounted. A cover plate 304 is mounted on base plate 300 and is shaped so as to be spaced away from (generally along a direction parallel to an axis of rotation of drive member 302) base plate 300, particularly in order to permit drive member 302 to be rotatably mounted between base plate 300 and cover plate 304. In one example of the present invention, at least a part of cover plate 304 is generally parallel to and spaced away from base plate 300 to define a space in which drive member 302 is disposed. Furthermore, the drive member 302 may be partly rotatably mounted on the base plate 300 and partly supported by cover plate 304. Base plate 300 and cover plate 304 may be attached to each other in any conventional manner suitable to space and environmental concerns, such as, without limitation, screws, bolts (see FIG. 3C), welding, gluing, etc.

Drive member 302 is illustrated as being circular, this being useful relative to addressing certain features of its rotational movement (as discussed below with reference to, for example, FIG. 3B). However, the particular shape of the drive member 302 is not overly critical to the present invention to the extent it satisfies space, size, and environmental limitations.

The axis of rotation of drive member 302 corresponds with the axis of rotation of pivoting handle 112 (see, for example, FIG. 4A) so that rotation of handle 112 drives rotation of drive member 302. In one example of the present invention, drive member 302 is provided with a central bore 306 (which is, for example, square in cross section in FIGS. 3A-3C) that is shaped to conformingly receive a mounting shaft 115 (see FIG. 4A) of handle 112 therein (see FIG. 4B). The shaft 115 may be fixed in place in central bore 306 if desired in any conventionally known manner. The shape of the handle 112 is not specifically critical to the present invention as long as it facilitates being manually gripped, so a knob, t-shaped handle, etc. could also be used.

In an example of operation, handle 112 is rotatable through an arc of about 90° (compare FIG. 1 and FIGS. 4A-4B). Because handle 112 is mounted to drive member 302 as described above, drive member 302 also rotates through an arc of about 90°.

The present invention is not necessarily limited to manual actuation via a handle 112. The drive member 302 could also be selectively actuated via, for example, a selectively operated motor (not illustrated here) suitably coupled to the drive member 302.

Drive member 302 is provided with first and second nubs 308, 310 on diametrically opposed edges of drive member 302 which is circular by way of example in the figures. If the drive member 302 is not circular, the nubs 308, 310 are provided on diametrically opposite sides of an imaginary circle of a given radius centered on the axis of rotation of drive member 302 (and handle 112).

As seen in FIGS. 3A-3C, the drive member 302 may desirably be biased towards rotation by way of a spring member 312 that is under tension at the extreme rotational positions of the drive member 302/handle 112 (compare FIG. 1 and FIG. 4B). For example, a coil spring 312 may be fixedly attached at one end to an end portion of cover plate 304, and attached at its other end to a third nub 314 provided on drive member 302. Nub 314 is provided circumferentially about halfway (or about 90° in a rotational sense) between nubs 308, 310 such that when the drive member 302 is rotated, nub 314 travels along a lower (as seen in FIGS. 3A-3C; compare in particular FIGS. 3B and 3C) edge of drive member 302. According to the present invention, the spring member 312 is useful and desirable, but not critical to operation.

In a particular example of the present invention, nubs 308, 310 extend (along the direction of the axis of rotation of drive member 302) beyond the cover plate 304 (see FIG. 3A). Cover plate 304 is therefore desirably provided with arcuate cutouts **304*a* at its edges corresponding with the respective paths of travel of nubs 308, 310 in order to accommodate the movement of these protruding nubs 308, 310. The cutouts 304*a* are about 90° in circumferential arc, corresponding to the limits of rotation of the drive member 302. The opposing ends of cutouts 304*a* may therefore desirably act as rotation limiters when the nubs 308,310** abut them.

FIGS. 3B and 3C show drive member 302 in opposite rotational positions (that is, at opposite extremes of rotation). As will be understood taking the written description and drawings as a whole, FIG. 3B corresponds to a position in which latch members 202', 204', 206', 208' are retracted and thus an "unlatched" position; FIG. 3C is the opposite position in which the respective latch members are extended and thus a "latched" position.

When spring 312 is provided under tension as shown in FIG. 3B, drive member 302 is biased towards counterclockwise rotation (relative to FIG. 3B), into the position shown in FIG. 3C. By rotation of drive member 302, nub 314 moves in FIG. 3C to the position previously occupied by nub 308 (in FIG. 3B). As a result, in the arrangement illustrated in FIG. 3C, spring 312 now biases the drive member 302 into clockwise rotation, similar to the manner in which it biased the drive member 302 into counterclockwise rotation starting from FIG. 3B. Preferably the tension in spring 312 in the positions illustrated in FIGS. 3B and 3C is relatively light—enough to assist or encourage rotation of drive member 302/handle 112 without causing drive member 302/handle 112 to rotate independently without operation of the handle 112.

In a particular example of the present invention, the flexible connectors 210, 212, 214, 216 are flexible cables having a structure similar to conventional (and commercially available) cables used in bicycles and motorcycles to actuate brakes, gear shifting and clutch mechanisms, and the like. Most generally, cables of this type include a metal central cable (for example, braided steel wire) that is freely slidable along its length within an outer flexible rubber, plastic, polymer, etc. tubular sheath. That is, the metal central cable can be pulled/released at one end to cause the metal cable to move freely relative to its surrounding sheath. In a common example of such cables, the internal metal cable is provided at at least one end with an enlarged anchor or head mounted thereon or attached thereto, by which a cooperating engaging portion can more easily engage and retain the metal cable to provide a selective pulling action relative to the sheath. Cables of this type used in motorcycles are comparatively thicker (with respect to overall cross section) than those used in bicycle applications and may considered desirably more mechanically durable than bicycle cables.

In accordance with the foregoing, the central actuation mechanism further includes a cable pull member 316. The cable pull member is illustrated only in FIG. 3C for the sake of clarity.

In general, cable pull member 316 is rigid member pivotably mounted (in any known manner) relative to nub 310 (in order to provide a linear pulling force component while accommodating rotation of drive member 302). As drive member 302 (and thus, in pertinent part, nub 310) moves between the positions illustrated in FIGS. 3B and 3C, cable pull member 316 is correspondingly moved in opposite directions.

The distal end of cable pull member 316 (that is, opposite the end mounted on nub 310) is, for example, generally shaped into a hooked portion having a plurality of slots into which respective metal cables of, inter alia, flexible connectors 210, 212, 214, 216 are fitted. (An end of an extra fifth flexible connector 218 is illustrated in FIG. 3C, but this does not change the underlying explanation of the present invention.) Each of the metal cables of flexible connectors is provided with a respective anchor 210', 212', 214', 216' that is sized and arranged so that is retained by the distal hook-shaped cross section 316' of cable pull member 316. Ultimately, the distal end of cable pull member may have any mechanical structure suitable for assuredly engaging the respective metal cables. The proximal ends of the flexible connectors may be held in, for example, generally parallel orientation relative to each other by an additional mounting bracket 318 as seen in FIG. 3C.

When the drive member 302 is rotated into the position illustrated in FIG. 3B, the cable pull member 316 is retracted relative to the bracket 318 in which respective ends of the flexible connectors are fixedly mounted. Because the anchors of the respective metal cables of the respective flexible connectors are retained in the distal hook-shaped portion 316' of cable pull member 316, the metal cables are pulled within their respective sheaths until the drive member 302 is returned to the position shown in FIG. 3C, at which point tension on the metal cables is released.

Figure 5:
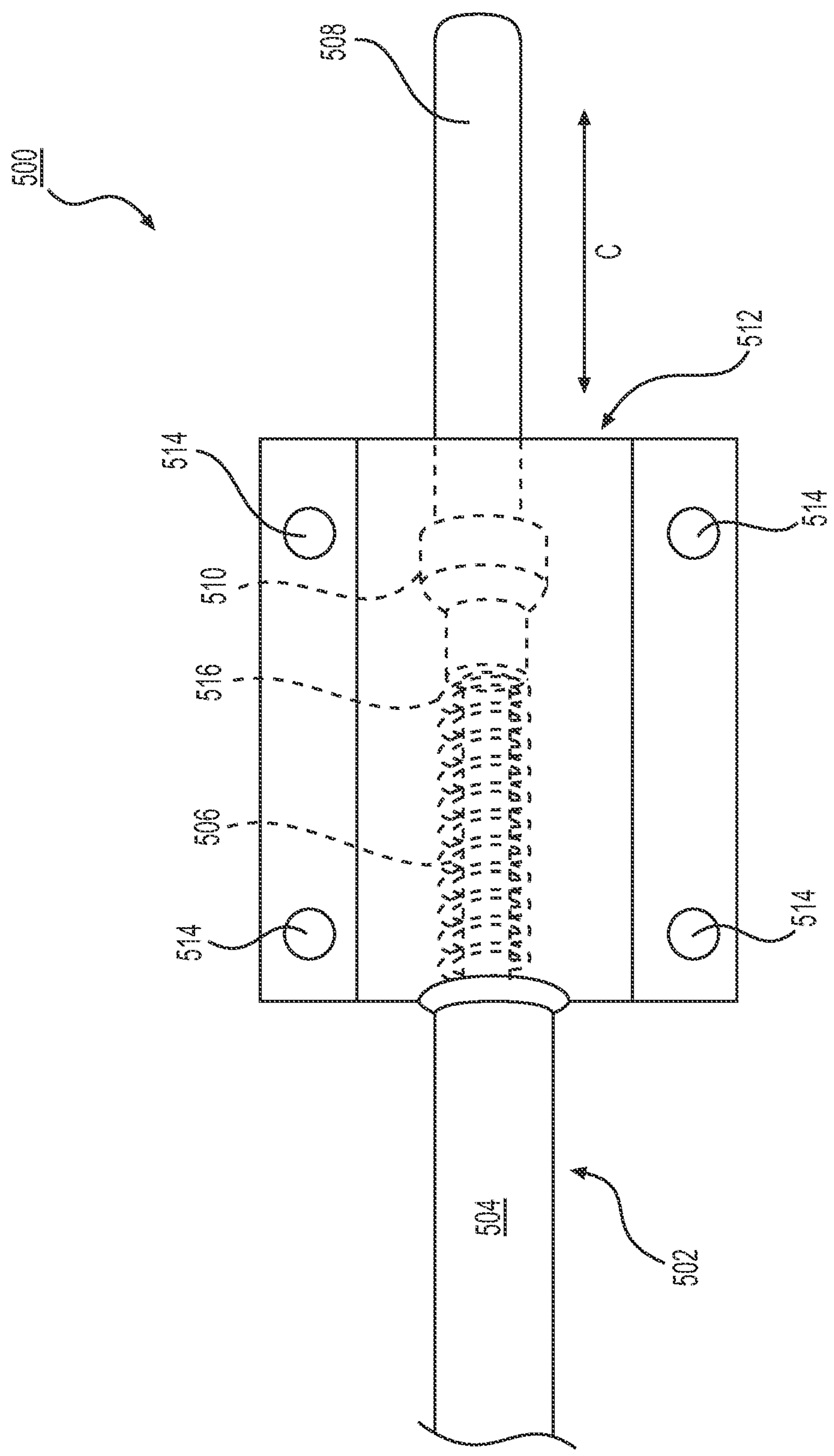
FIG. 5 is a plan view of an example of a latch mechanism according to the present invention.

FIG. 5 illustrates an exemplary structure of the latch mechanisms 202, 204, 206, 208 of the present invention.

An example of a latch mechanism 500 according to the present invention is connected to a flexible connector 502 of the type described above. The flexible connector 502 has an outer flexible sheath 504 as described above, and a freely slidable cable (for example, a metal cable) 506 disposed within the sheath 504. The opposite end of cable 506 from the latch mechanism 500 terminates at, for example, an anchor provided on an end of cable 506 in the manner illustrated in FIG. 3C. An elongate latching member 508 is fixedly attached to an end of cable 506 by a connector 510. Connector 510 may be, for example, a sleeve or ferrule having one end having a diameter suitable for receiving an end of cable 506 and a second end having a diameter having a diameter suitable for receiving an end of latching member 508, bearing in mind that these respective diameters may differ. Connector 510 may be attached to cable 506 and latching member 508 in any known matter suitable for the intended use, including without limitation, crimping the connector onto one or both of the cable 506 and latching member 508, adhesive, welding, etc.

The latching member 508 is preferably made of a generally rigid material that resists bending that is appropriate for the actual and commercial environment. As such, the latching member 508 could be made from, without limitation, hard polymer resin, plastic, metal, or even wood.

As seen generally in FIG. 2, each latch mechanism 500 includes a housing or shell 512 that is generally rigid and may be made from, for example, metal or hard plastic. In general, the flexible connector 502 is connected to the housing 512 such that some or all of the portion of the cable 506 extending outside of the sheath 504, a proximal end of latching member 508, and the connector 510 connecting the cable 506 and latching member 508 is disposed within the housing 512. In general, the latch mechanism 500 can be fixed in a desired location by screws, nails, staples, etc. driven through peripheral portions of housing 512 into an underlying surface. See, for example, fixation points 514 schematically indicated in FIG. 5.

When cable 506 is thusly connected to latching member 508, the latching member 508 can be extended and retracted relative to housing 512 (see arrow C in FIG. 5) in accordance with the tension selectively applied at the other end of the flexible connector via the operation of the central actuation mechanism 110 that selectively applies tension to the cable 506.

In one example of the present invention, a resilient biasing member, such as a coil spring 516 may be included in the latch mechanism 500 in order to bias the latching member 508 towards an extended direction. For example, the coil spring 516 may be provided such that a portion of cable 506 extends axially therethrough as seen by way of example in FIG. 5. One end of the coil spring may be disposed in abutting relationship with, for example, a proximal wall of housing 512. The other end of coil spring 516 may abut, for example, a radially outward extending portion of connector 510. The coil spring 516 may be in a neutral state of tension when the latching member 508 is at its fully extended position or it may be under relatively light compressive tension, such that retracting the latching member 508 (by pulling cable 506) compresses or further compresses coil spring 516 so that the latching member 508 is biased towards an extended latching position.

Returning to FIGS. 3B and 3C, it will be recalled that FIG. 3B corresponds to an unlatched position of the system, in which the respective latching members (like 508) are retracted from a latching position. The cable pull member 316 is pulled relative to the flexible connectors in FIG. 3B, such that the metal cables of the flexible connectors are pulled within their respective sheaths, and the respective latching members at the other ends of the flexible connectors are retracted, as was discussed with reference to FIG. 5.

When the central actuation mechanism 110 is put in the position shown in FIG. 3C (the latching position in which the latching members of the latch mechanisms extend), the cable pull member 316 is lowered such that tension on the metal cables is released. However it should be understood that the tension on the metal cables is merely released at the central actuation mechanism 110. For this reason, the provision of a biasing member, such as coil spring 516 in FIG. 5, assists in the latching members attaining an extended position when tension on metal cable 506 is released by the central actuation mechanism 110.

Returning to FIG. 5, latching member 508 may be arranged to protrude from a similarly sized bore or opening (not specifically illustrated in FIG. 5) formed in a corresponding end of housing 512. The bore may thus serve to allow the latching member 508 to extend and retract axially (that is, along arrow C) while at least partly limiting lateral movement of the latching member 508. Depending on the application in which the present invention is used, it may be useful to limit the extent to which the latching member 508 extends outside of housing 512 so as to limit bending forces on the latching member 508 that could snap the latching member (if, for example, one were to try and force open one of the drawers 109, 111, 113 when a respective latching member is extended into a latching position).

Several applications of the locking system of the present invention will be described hereinbelow. The details of the structure and functioning of the locking system described above apply completely to the examples that follow, so detailed descriptions already made above are not repeated.

Figure 6A:
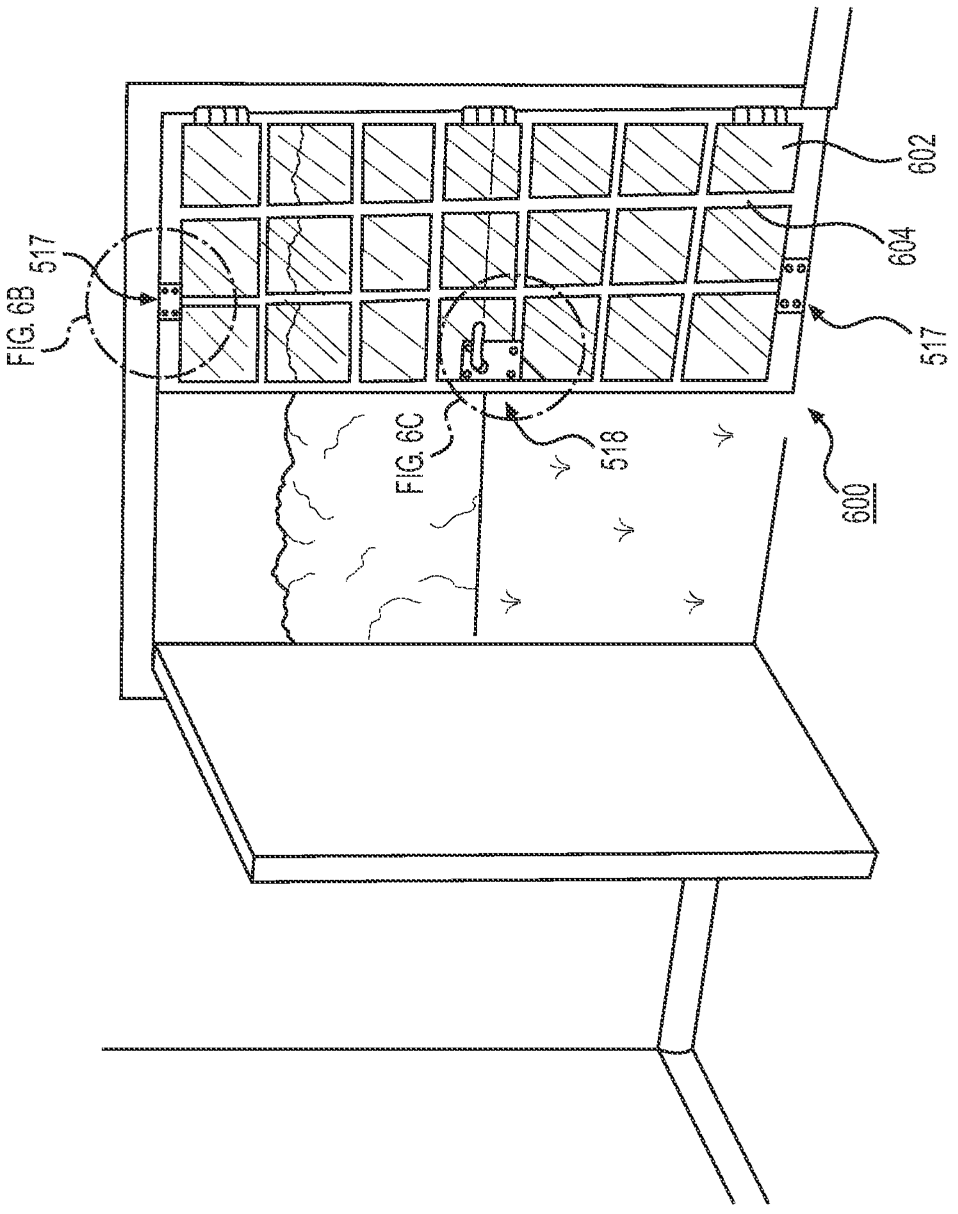
FIG. 6A is a perspective view illustrating an application of the locking system in a French door arrangement.
Figure 6B:
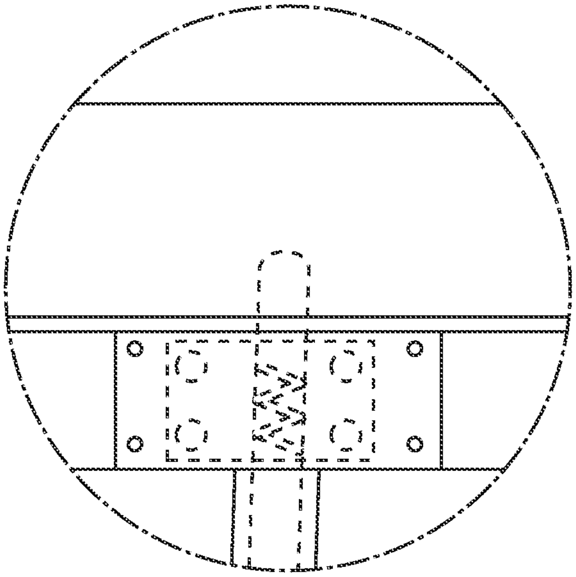
FIG. 6B is an enlarged schematic view of a latch mechanism as used in the arrangement illustrated in FIG. 6A.
Figure 6C:
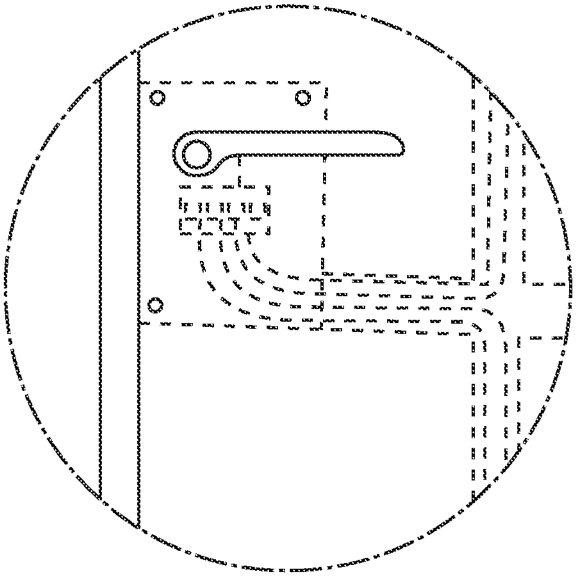
FIG. 6C is an enlarged schematic view of a central actuation mechanism as used in the arrangement illustrated in FIG. 6A.

FIGS. 6A-6C illustrate the use of the invention to lock a French door 600 in multiple places. (It could be equally applied to a French window.) As is conventionally known, a French door is particularly characterized by a high proportion of glass (or other transparent or translucent light-transmitting material) relative to the overall surface area of the door. For example, the door 600 may be provided with a rectilinear grid or lattice framework defining a plurality of, for example, square openings therein, into which corresponding panes of glass (or other light-transmitting material) are mounted.

Because the aesthetics of the French door (or window) fundamentally depend on maximizing the light passing therethrough (in view of the large area of light-transmitting material), it is undesirable to obscure or otherwise block the glass (or the like) of the door with hardware, such as elements of a door lock like a conventional rigid locking bar. Furthermore, it is desirable to distribute more than one locking or latching point about the periphery of the door (e.g., beyond merely along one vertical edge where a conventional door latch is located). In particular, multiple locking points can increase the security of the door when locked, making it comparatively more difficult to open or, particularly, force open.

Accordingly, in an embodiment of the present invention the locking system of the present invention is provided in, for example, a French door 600 having a lattice or grid-like frame 604 that defines a plurality of openings in which glass or other light-transmitting material 602 is provided. The frame 604 may be made, for example, from metal or molded synthetic material like plastic or the like, and may include aesthetically desirable features such as surface textures or colored highlights. One or more latch mechanisms 517 (of the type illustrated in FIG. 5) are provided at respective locations along the edge of the door 600 in accordance with the disclosure of the invention set forth herein. Preferably, each latch mechanism 517 is installed within a thickness of the door 600 so as to be substantially hidden from view. Alternatively, the latch mechanisms 517 could be mounted on an interior surface of the door 600 and be covered by an aesthetically pleasing or at least neutral looking housing or the like, like housing 512 in FIG. 5.

In FIG. 6A, two such latch mechanisms 517 are provided by way of example. The latching member of each latch mechanism 517 selectively engages an opposing member (here, the door frame and the floor) depending on extension or retraction of the latching member in the manner described hereinabove, as seen in more detail in FIG. 6B.

The central actuation mechanism as described hereinabove can be provided in the door as shown in more detail in FIG. 6C, and provided with a manually graspable handle or doorknob 518 as shown, for driving the central actuation mechanism as previously described. The handle or doorknob 518 can be lockable (such as with a key) to prevent rotation thereof, thereby preventing retraction of the latching members of latch mechanisms 517 so as to lock the door 600 closed.

In an example of this embodiment, the frame 604 at least partly defines a hollow or bore therein, through which the respective flexible connectors connecting the latch mechanisms 517 with the central actuation mechanism can be threaded or otherwise disposed (as schematically indicated in FIG. 6C). This desirably hides the flexible connectors from view and preserves the aesthetic appeal of the door 600.

Figure 7A:
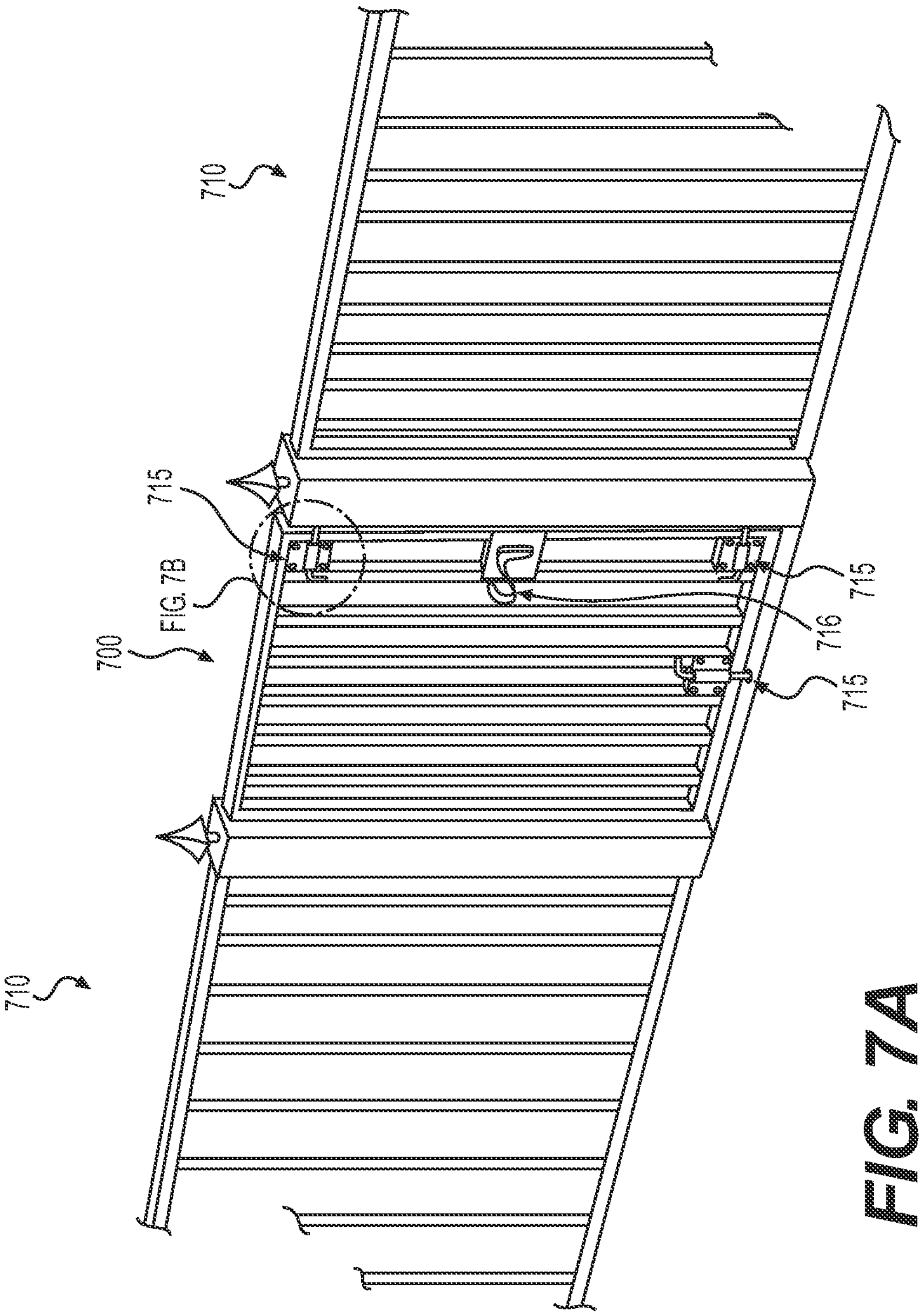
FIG. 7A is a perspective view of a fence in which the locking system of the present invention is applied.
Figure 7B:
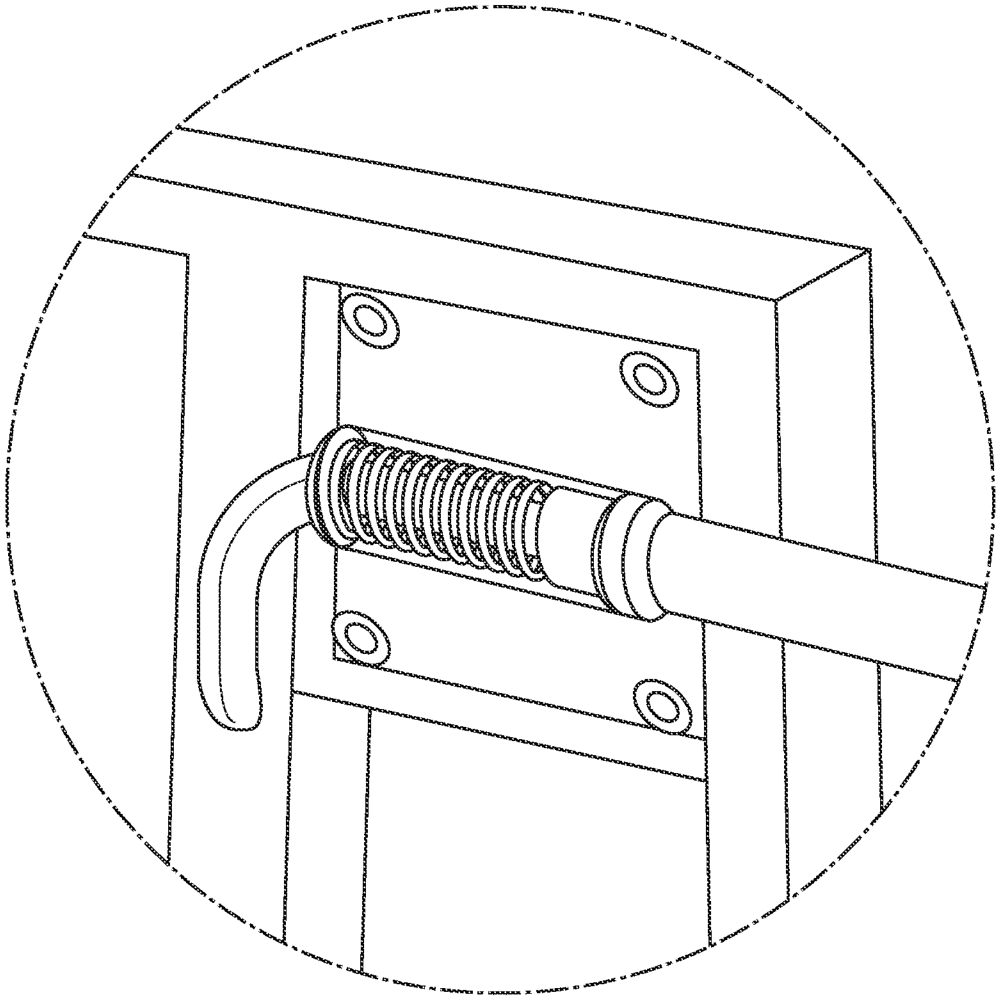
FIG. 7B is an enlarged schematic view of a latch mechanism as used in the arrangement illustrated in FIG. 7A.

FIGS. 7A and 7B illustrate the use of the locking system of the present invention in a hinged gate or the like, particularly in an exterior fence or similar barrier. In FIG. 7A, a gate 700 is hingedly mounted to selectively permit passage through a fence 710 in a known manner. The gate 700 can be selectively latched shut and locked using the locking system of the present invention. Here, strictly by way of example, three latch mechanisms 715 are provided as indicated (but the number of mechanisms provided can vary as needed). Again, the latch mechanisms 715 may be structurally of the same type as that disclosed and described relative to FIG. 5.

Like the French door in FIG. 6A, the latch mechanisms 715 can be provided so as to be disposed substantially within a structural portion of the gate. This is again desirable because it preserves the aesthetic presentation of the fence and the gate. It is additionally desirable because it protects the latch mechanisms 715 from tampering as well as from weather. Alternatively, the latch mechanisms may be mounted on an interior surface of the gate 700 by known fixation means, but preferably using a relatively permanent fixation like rivets (so as to prevent detachment or other tampering). Such an arrangement can be useful for permitting retrofitting of an original gate with a locking system of the present invention.

The gate 700 can be selectively opened (i.e., unlatched) via a centrally located handle or doorknob 716, which is provided in association with the central actuation mechanism of the present invention as described above. The handle 716 can be locked as desired to prevent rotation as discussed herein, either by a self-contained lock mechanism like a conventional key cylinder or, for example, by threading a padlock or the like through the handle and an eyelet (in the manner discussed above relative to FIGS. 4A and 4B).

Like the door 600 in FIG. 6A, the flexible connectors connecting the latch mechanisms 715 to the central actuation mechanism are preferably completely (or at least mostly) threaded or otherwise provided within hollow portions of the gate structure (such as the vertical metal bars of certain fencing). This is also useful for protecting the flexible connectors from tampering. For example, FIG. 7B illustrates a latch mechanism 715 mounted on a surface of the gate, connected to a respective flexible connector of which a relatively minimal portion is exposed.

FIGS. 8A-8F illustrate the use of the present invention to lock a secured container 800 (i.e., lid 802 and box 804) to (or in) a vertical or horizontal surface (like a wall or a floor). The lid 802 of the box 804 has a rotatable handle 806 which actuates the locking/latching mechanism of the present invention. The surface (wall or table or floor) has a space or recess 810 sized and shaped in conformance with the container 800 and receives the container therein and is adapted to engage the locking mechanism. See, for example, FIGS. 8C, 8D, and 8E.

Figure 8A:
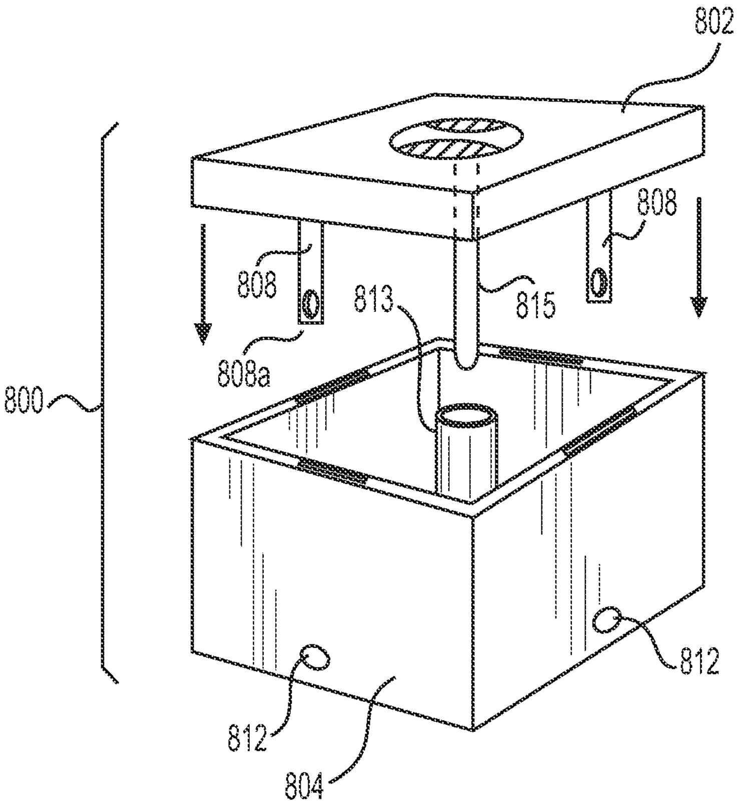
FIGS. 8A-8F illustrate a portable and lockable storage box that can be locked closed and then locked in a certain location (such as in a recess in a wall) in accordance with the present invention.
Figure 8B:
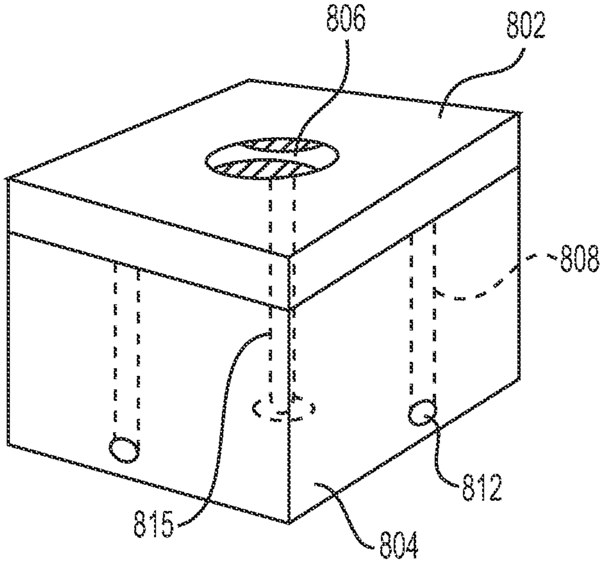
Figure 8C:
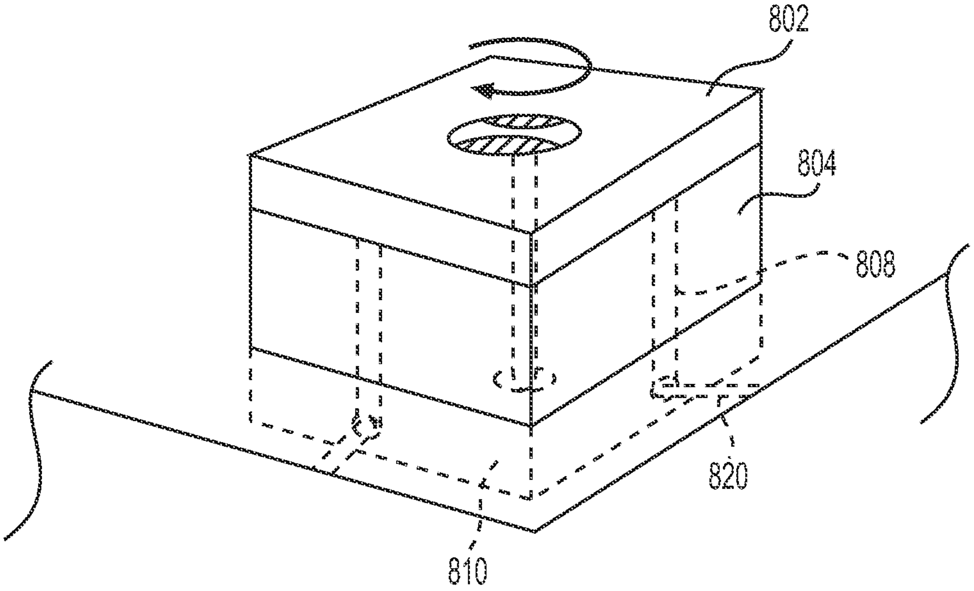
Figure 8D:
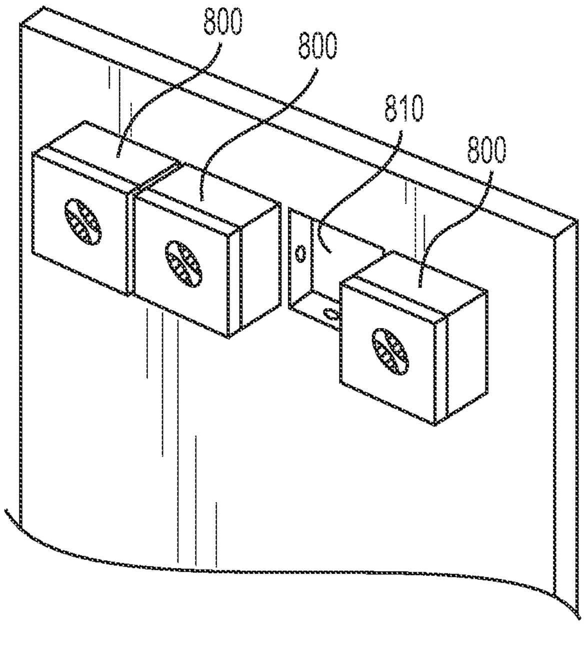
Figure 8E:
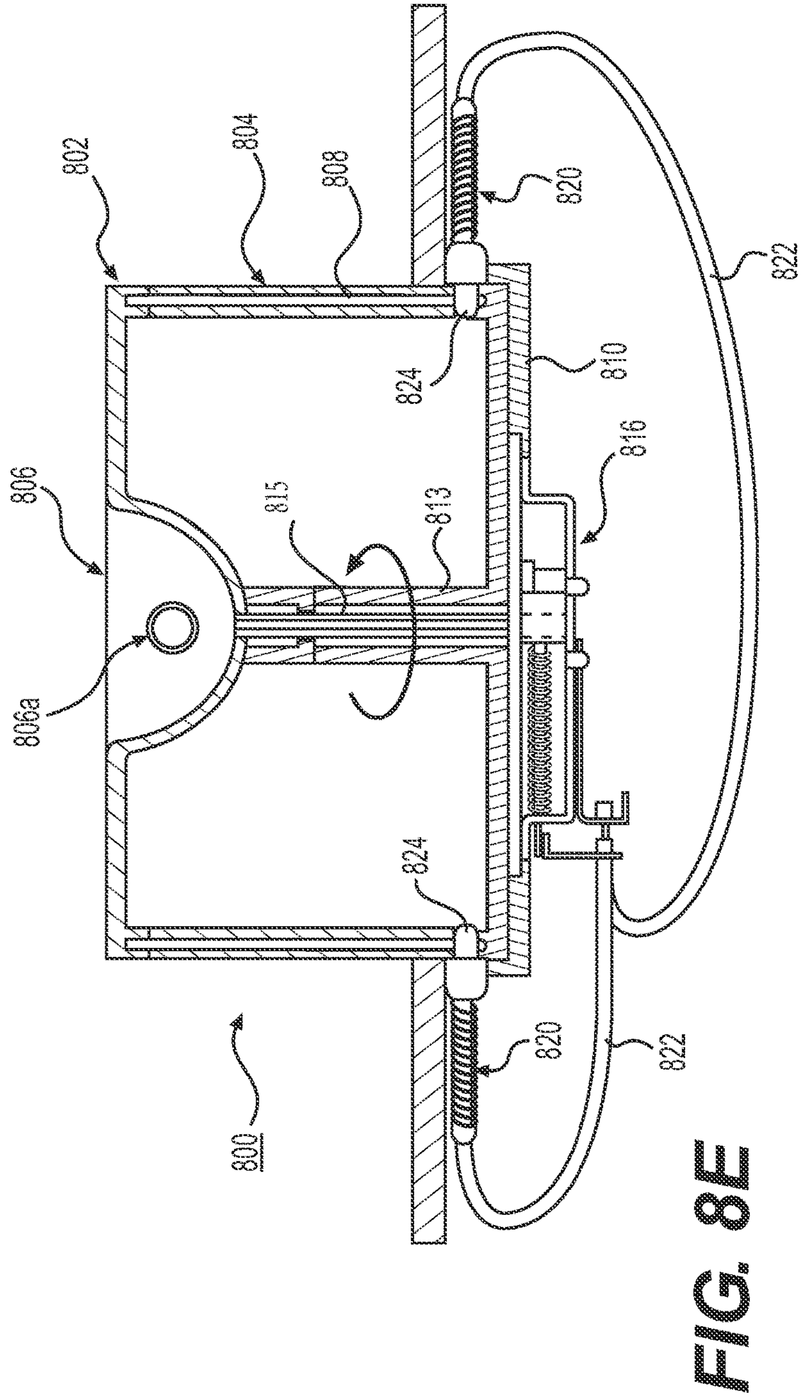
Figure 8F:
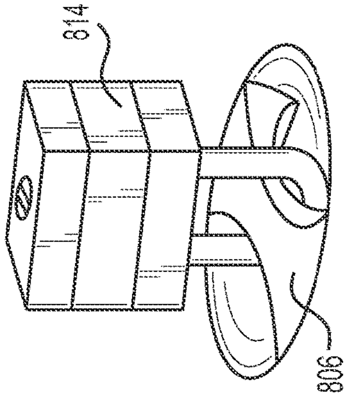

Once the lid 802 is placed on the box 804 and the container 800 is then placed into the space 810, the user turns the handle 806, which activates the elements of the locking system of the present invention, which here, differently, are provided outside of the container 800 being locked—that is, the central actuation mechanism, flexible connectors, and latch mechanisms are provided within the surface (e.g., a wall) in which the receiving recess 810 is formed, as discussed further below, particularly with respect to FIG. 8E.

More particularly, the lid 802 is provided with one or more elongate and rigid lock bars 808 (e.g., made from metal or rigid plastic or the like) that extend perpendicularly downward from the plane of the lid 802 (i.e., along the direction of mounting and dismounting the lid 802 relative to box 804, indicated by arrows in FIG. 8A). The lock bars 808 are provided at a distal end thereof with a respective bore 808*a* therethrough.

In general, when the lid 802 is put into place relative to box 804, the bores 808*a* align with corresponding bores 812 formed through the sides of box 804, as in FIG. 8B. In one example of the present invention, the lock bars 808 are received in respective slits (not shown) in the sides of box 804 (i.e., within the thickness of the walls of box 804) that are sized and positioned to guide the lock bars 808 (and the bores 808*a* thereof) into alignment with the bores 812. In another example, the lock bars 808 may simply be disposed generally on the interior of the box 804 when the lid 802 is closed so that the bores 808*a* and 812 align.

FIG. 8C schematically illustrates the container 800 disposed in a receiving space 810, such as a floor. When disposed in the space 810, the bores 808*a* and 812 are additionally aligned with either bores formed the periphery of the space 810 or directly with the latching members of the latch mechanisms provided relative to the space 810, as discussed below. In general, according to the present invention a respective latching member 824 of a given latch mechanism 820 selectively extends into locking engagement through bore 812 of the box 804 and the locking bar 808*a* aligned thereto. See, for example, FIG. 8E. In this manner, both the box 804 and the lid 802 (via locking bar(s) 808) are lockingly retained relative to the space 810 and the surface in which the space 810 is provided.

FIG. 8D illustrates an example of several containers 800 mounted in a wall, each of which can be individually removed or locked into place as described here.

FIG. 8E is a cross-sectional view of a container 800 locked into a receiving space 810 as described above. As mentioned above, lid 802 includes a rotatable handle 806 that operably engages with the central actuation mechanism 816 according to the present invention, which is provided, for example, underneath the bottom surface of receiving space 810, as seen in FIG. 8E. In one example, the handle 806 is connected to a rotation shaft 815 of sufficient length to engage and rotatably drive the central actuation mechanism 816. Shaft 815 extends generally downwardly and perpendicularly from the plane of lid 802 (i.e., generally in parallel with locking bars 808). Shaft 815 can be provided, for example, with a distal tip shaped to engage a corresponding engagement opening or socket in the drive member of the central actuation mechanism (such as a square cross-sectional tip for engaging a correspondingly sized square cross-sectional socket or aperture in the drive member).

In one example, the box 804 may be provided with an upwardly extending hollow column, channel or tube 813, through which shaft 815 is inserted when the cover 802 is used to close box 804. The length of shaft 815 may for example be sufficiently long so as to protrude slightly from the bottom of box 804 so that the distal tip of the shaft 815 can be engaged through an aperture or the like in the bottom of space 810 with the central actuation mechanism so that the central actuation mechanism can be operated by rotation of handle 806.

The central actuation mechanism 816 is connected with respective latch mechanisms 820 via flexible connectors 822 in accordance with the description hereinabove. When the central actuation mechanism 816 is operated, latch members 824 of latch mechanisms 820 are selectively extended through bores 812 in box 804 and bores 808*a* of the locking bars 808. As a result, the container 800 is lockingly retained in space 810, and additionally the lid 802 is lockingly retained relative to the box 804, so that the container 800 is locked in a closed state. Moreover, the elements of the locking system of the present invention are all hidden from exposure to tampering, thereby increasing the security of the arrangement.

The handle 806 can have any suitable conventional form, such as a graspable handle (see, for example, FIG. 4) or a conventional doorknob or the like, or the structure illustrated in FIGS. 8A-8F. The handle 806 can be selectively locked (i.e., prevented from rotating) by, for example, a conventional key lock cylinder provided therein, or an eyelet arrangement through which a padlock or the like can be engaged to prevent rotation of handle 806. See, for example, FIG. 8F or FIGS. 4A and 4B (and the written description associated therewith).

Although the present invention is described above with reference to certain particular examples for the purpose of illustrating and explaining the invention, it must be understood that the invention is not limited solely with reference to the specific details of those examples. More particularly, the person skilled in the art will readily understand that modifications and developments that can be carried out in the preferred embodiments without thereby going beyond the ambit of the invention as defined in the accompanying claims.

What is claimed is:

1. A system for lockingly closing and securing a portable lockbox to an underlying base, the system comprising:

the lockbox, wherein the lockbox includes a box body and a cover for closing the box, and the base having a recess within which the lockbox can be securely fixed, the recess being sized and configured to receive a portion of the lockbox;

wherein the cover comprises at least one locking tab extending therefrom, the at least one locking tab having a bore formed therethrough adjacent a distal end thereof, wherein the cover further comprises a rotatable handle fixedly associated with a correspondingly rotatable shaft extending into the interior of the box body, wherein the box body comprises a sidewall and a bottom, and an open side opposite the box body bottom, the open side being sized and shaped to conform with the cover so as to be selectively closable thereby, wherein the box body includes a corresponding at least one bore formed through the sidewall at a location corresponding to the bore formed through the at least one locking tab of the cover when the cover is situated to close the open side of the box body, wherein the recess comprises a sidewall and a bottom in a configuration corresponding to the sidewall and bottom of the box body, wherein the recess is provided with a locking system for lockingly retaining the lockbox in the recess, wherein the locking system comprises:

a central actuation mechanism; and a number of latch mechanisms corresponding to the number of locking tabs associated with the cover, each latch mechanism being operably connected to the central actuation mechanism via a respective flexible connector, each latch mechanism comprising an elongate latching member constructed and arranged to be selectively extended along a direction of extension of the elongate latching member into a latching position and retracted into a release position and in correspondence with an operation of the central actuation mechanism, wherein each latch mechanism is located in the base adjacent to the sidewall of the recess in a location corresponding to the at least one bore formed through the sidewall of the box bottom, the sidewall of the recess also having a bore formed therethrough permitting the latching member of the at least one latching mechanism to be selectively extended and retracted through the bore of the sidewall of the recess so that the latching member further selectively extends through and retracts from the at least one bore formed in the box body sidewall and the bore formed in the at least one locking tab, thereby selectively retaining the box body relative to the recess and the cover relative to box body;

wherein each respective flexible connector comprises an inner flexible cable slidably disposed within an outer flexible tubular sheath, wherein a first end of the inner cable is connected with an end of the corresponding latching member and a second end of the inner cable is operably connected with the central actuation mechanism, such that extension and retraction of the latching member corresponds with extension and retraction of the inner cable within the outer sheath obtained by operation of the central actuation mechanism;

wherein the central actuation mechanism comprises:

a base plate;

a drive member rotatably mounted on the base plate, the drive member being operably engageable with the rotatable shaft of the cover when the cover is situated to close off the open side of the box body; and a cable pull member pivotably connected to a peripheral portion of the drive member, the cable pull member including an engaging portion for engaging respective second ends of the inner cables of the flexible connectors opposite the first ends of the inner cables connected to the respective latching members;

wherein the drive member is rotatable between a latching position in which the latching members are extended and a release position in which the latching members are retracted, wherein the release position of the drive member is located such that it causes the cable pull member connected thereto to move in a direction that pulls the inner cables engaged by the engaging portion;

wherein the central actuation mechanism is selectively lockable in a state in which the plurality of latch mechanisms and the drive member are in the latching position.

2. The system according to claim 1, wherein the latching member of each latch mechanism is resiliently biased towards extension.

3. The system according to claim 1, wherein the drive member is resiliently biased to rotate towards the release position from the latching position and towards the latching position from the release position.

4. The system according to claim 1, wherein the engaging portion of the cable pull member comprises a hooked portion having a plurality of slots formed therein and the second ends of the respective inner cables have an anchor, such that each respective inner cable is selectively received in a respective slot of the engaging portion and retained therein by the respective anchor.

5. The system according to claim 1, wherein the rotatable handle of the cover and a corresponding adjacent part of the cover are constructed and arranged to receive an external lock device therethrough to lock the rotatable handle in place in a position corresponding to the latching position, thereby the locking the central actuation mechanism selectively lockable in a state in which the plurality of latch mechanisms and the drive member are in the latching position.

6. The system according to claim 5, where the cover is provided with a flange having an eyelet formed therethrough and a portion of the rotatable handle also has an eyelet formed therethrough, wherein the eyelet of the flange and the eyelet of the rotatable handle are in substantial alignment when the rotatable handle is rotated to the latching position, so that the external lock device can be passed therethrough to substantially prevent rotation of the rotatable handle away from the latching position.

7. The system according to claim 1, wherein the rotatable handle of the cover is provided with a key-operated lock cylinder therein for selectively preventing rotation of the rotatable handle and thereby locking the rotatable handle in the latching position.

8. The system according to claim 1, wherein the sidewall of the box body has a slot formed therein sized and arranged to guidingly receive the at least one locking tab of the cover therein when the cover is situated to close off the open side of the box body, wherein the at least one bore formed in the sidewall is provided in alignment with the slot so that the bore formed in the at least one locking tab and the corresponding bore formed in the sidewall of the box body are aligned when the cover is situated to close off the open side of the box body.

9. The system according to claim 1, wherein the at least one locking tab of the cover is inward from the sidewall of the box body when the cover is situated to close off the open side of the box body, with the bore formed in the at least one locking tab adjacent to and aligned with the at least one bore formed in the sidewall of the box body.

10. The system according to claim 1, wherein the bottom of the box body is provided with a bore formed therethough through which the rotatable shaft of the cover passes to be operably engaged with the drive member of the central actuation mechanism.

11. The system according to claim 10, wherein the bore provided in the bottom of the box body is a hollow column member extending away from the bottom of the box body towards an interior thereof, into which the rotatable shaft of the cover is guidingly received when the cover is situated to close off the open side of the box body.

* * * * *